US006802997B2

(12) United States Patent
Uekado et al.

(10) Patent No.: US 6,802,997 B2
(45) Date of Patent: Oct. 12, 2004

(54) METHOD OF MANUFACTURING RIGID POLYURETHANE FOAM MATERIAL, METHOD OF MANUFACTURING REFRIGERATOR, AND REFRIGERATOR

(75) Inventors: Kazutaka Uekado, Nishinomiya (JP); Akiko Yuasa, Kyotanabe (JP)

(73) Assignee: Matsushita Refrigeration Company, Higashiosaka (JP)

( * ) Notice: Subject to any disclaimer, the term of this patent is extended or adjusted under 35 U.S.C. 154(b) by 69 days.

(21) Appl. No.: 10/291,273

(22) Filed: Nov. 8, 2002

(65) Prior Publication Data

US 2003/0134917 A1 Jul. 17, 2003

Related U.S. Application Data

(62) Division of application No. 09/841,677, filed on Apr. 24, 2001, now Pat. No. 6,660,779.

(30) Foreign Application Priority Data

Apr. 28, 2000 (JP) ........................................ 2000-129135
May 14, 2000 (JP) ........................................ 2000-142845

(51) Int. Cl.$^7$ ................................................ C08J 11/04
(52) U.S. Cl. ..................... 264/45.1; 521/49; 521/49.5; 521/170
(58) Field of Search .................... 521/49, 49.5, 170; 264/45.1

(56) References Cited

U.S. PATENT DOCUMENTS 5,208,379 A 5/1993 Yang et al.

FOREIGN PATENT DOCUMENTS

| EP | 0 976 719 | 2/1998 |
| EP | 1 006 143 | 10/1999 |
| JP | 9-151384 | 6/1997 |
| JP | 10-310663 | 11/1998 |
| WO | WO 97/27243 | 7/1997 |

OTHER PUBLICATIONS

"Labeling and Advertising of Home Insulation (R–Value Rule)"; 16 CFR 460 (Oct. 1996).*
"Climate Safe Refridgerator Label Adopted by EC"; Press Release by: Greenpeac.org (Nov. 1996).*
Photo: England Royal Wedding Bottle (Jul. 1981); www.2collectcola.com/page/ACC/CTGY/B.*

* cited by examiner

Primary Examiner—John M. Cooney, Jr.
(74) Attorney, Agent, or Firm—Merchant & Gould P.C.

(57) ABSTRACT

The present invention provides a method of manufacturing a rigid polyurethane foam material, a method of manufacturing a refrigerator using the material, and a refrigerator manufactured by the same method. The method includes recovering highly purified rigid polyurethane foam from a scrapped refrigerator, and decomposing the rigid polyurethane foam for recycling. The method includes steps of: shredding a scrapped refrigerator containing rigid polyurethane foam in order to separate rigid polyurethane foam lumps; grinding the rigid polyurethane foam lumps into a rigid polyurethane foam powder; liquefying the rigid polyurethane foam powder by either aminolysis reaction or glycolysis reaction; reacting thus obtained liquefied rigid polyurethane foam powder and supercritical/sub-critical water in order to decompose the rigid polyurethane foam powder into a crude material; and fractionating the crude material to obtain a raw material of rigid polyurethane foam.

3 Claims, 19 Drawing Sheets

METHOD OF MANUFACTURING RIGID POLYURETHANE FOAM MATERIAL, METHOD OF MANUFACTURING REFRIGERATOR, AND REFRIGERATOR

This application is a divisional of application Ser. No. 09/841,677, filed Apr. 24, 2001 now U.S. Pat. No. 6,660,779, which application(s) are incorporated herein by reference.

BACKGROUND OF THE INVENTION

1. Field of the Invention

The present invention relates to a technology for recycling rigid polyurethane foam. More specifically, the present invention relates to a technology to decompose rigid polyurethane foam to recycle it as a material of an insulator of a refrigerator or the like.

2. Description of the Related Art

From a viewpoint of resource conservation, recycling of scrapped household electric appliances such as refrigerators and televisions has been emphasized, and various endeavors have been undertaken for that purpose. In recycling of refrigerators, metallic materials such as iron plates and copper pipes can be recycled with relative ease. However, plastics, especially rigid polyurethane foam as a thermosetting resin, which is commonly used for insulators, is difficult to melt and recycle. Generally, such plastics are disposed of in reclaimed lands or incinerated, or they are reused as fillers.

Under this condition, techniques to decompose polymer materials by treating with supercritical water and sub-critical water have been proposed. For example, JP-A-10-310663 suggests a method for decomposing and recycling polyurethane resin. The reference describes decomposition of polyurethane resin by using supercritical or sub-critical water in order to recover starting compounds of the polyurethane resin or available starting derivatives. Japanese Patent No. 2885673 describes decomposing polymer materials by using supercritical or sub-critical water in order to decompose the materials into oils.

However, since rigid polyurethane foam included in a scrapped refrigerator is covered with an iron plate or with an ABS resin, it cannot be decomposed by treating with supercritical water. Various polymer materials used for interior members of a refrigerator, such as polypropylene resin, can be decomposed by using supercritical water or sub-critical water. However, when the members are decomposed together, various resulting low molecular weight materials will be melted as impurities in the mixed materials. As a result, the material cannot be reused for a rigid polyurethane foam material.

Therefore, for the purpose of industrial recycling, discrimination of rigid polyurethane foam from scrapped refrigerators is the most important to recycle starting compounds of polyurethane resin or any available starting derivatives. The rigid polyurethane foam is requested to be free of dissimilar materials or impurities. Another fundamental aim is to establish waste treatment for decomposing and recycling iron and non-ferrous metals and providing a high recycling rate as an entire system.

The chemical structure of rigid polyurethane foam to be decomposed affects the determination on starting compounds of polyurethane resin obtainable by decomposition and available starting derivatives. The factors vary depending on the materials of the original rigid polyurethane foam. Therefore, it is important to select a method of manufacturing materials suitable for the original rigid polyurethane foam.

Still another aim for recycling is to use polyurethane resin compounds obtainable by decomposition and available derivatives, and reuse the materials for insulators of refrigerators.

A critical problem is that when rigid polyurethane foam used in a scrapped refrigerator is not identified properly, suitable methods for treating and manufacturing cannot be determined, and this prevents recycling.

SUMMARY OF THE INVENTION

In order to solve the problem described above, the present invention provides a method of manufacturing a raw material of rigid polyurethane foam, a method of manufacturing a refrigerator from recycled rigid polyurethane foam, and a refrigerator, so that the recycling rate for scrapped refrigerators is improved, and thus, the present invention serves for resource conservation.

The method includes steps of shredding a scrapped refrigerator containing rigid polyurethane foam in order to obtain rigid polyurethane foam lumps, grinding the lumps in order to obtain a rigid polyurethane foam powder, liquefying the rigid polyurethane foam powder by either an aminolysis or glycolysis reaction, and reacting the thus obtained liquefied rigid polyurethane foam powder with a supercritical water or sub-critical water in order to decompose the rigid polyurethane foam.

Accordingly, rigid polyurethane foam free of impurities such as resins can be extracted on an industrial scale from a rigid polyurethane foam lump contained in a scrapped refrigerator. It should be specifically noted that since the rigid polyurethane foam is liquefied, fragments of impurities such as other polypropylene resins can be filtered to obtain a pure composition of hard polyurethane foam. By treating the liquefied rigid polyurethane foam powder with supercritical or sub-critical water, the composition can be decomposed into amines and polyol of rigid polyurethane foam having substantially no impurities.

Preferably in the above method, the rigid polyurethane foam powder is liquefied by mixing with an additive comprising at least one compound selected from ethylene glycol, propylene glycol, monoethanolamine and tolylenediamine before heating. Since the compound serves to decompose and liquefy a part of the urethane bonding selectively, fragments of impurities can be removed efficiently.

Preferably in the above method, a ratio of the additive to the rigid polyurethane foam powder is from 0.4:1 to 5.0:1 by weight, and the reaction temperature ranges from 100 to 250° C.

Preferably in the above method, a ratio of the supercritical/sub-critical water to the liquefied rigid polyurethane foam powder is from 0.4:1 to 5.0:1 by weight, and the liquefied rigid polyurethane foam powder is reacted with the supercritical/sub-critical water at a temperature ranging from 190 to 400° C. and at a pressure ranging from 10 to 25 MPa.

Preferably in the above method, an average particle diameter of the rigid polyurethane foam powder ranges 1 $\mu$m to 3 mm.

Preferably in the method, the rigid polyurethane foam is manufactured by foaming either a diphenylmethane diisocyanate composition or a tolylene diisocyanate composition.

A method of manufacturing rigid polyurethane foam according to the present invention comprises steps of:

shredding a scrapped refrigerator including rigid polyurethane foam in order to separate lumps of rigid polyurethane foam, grinding the rigid polyurethane foam lumps into a rigid polyurethane foam powder, liquefying the rigid polyurethane foam powder by an aminolysis reaction or a glycolysis reaction, reacting the liquefied rigid polyurethane foam powder with either supercritical water or sub-critical water in order to decompose the rigid polyurethane foam powder to obtain a crude material, fractionating the crude material, and subsequently addition-polymerizing the fractionated ingredient with at least one of ethylene oxide and propylene oxide in order to synthesize polyetherpolyol.

A method of manufacturing rigid polyurethane foam according to the present invention comprises steps of:

shredding a scrapped refrigerator including rigid polyurethane foam in order to separate lumps of rigid polyurethane foam, grinding the rigid polyurethane foam lumps into a rigid polyurethane foam powder, liquefying the rigid polyurethane foam powder by an aminolysis reaction or a glycolysis reaction, reacting the liquefied rigid polyurethane foam powder with either supercritical water or sub-critical water in order to decompose the rigid polyurethane foam powder to obtain a crude material, and fractionating the crude material and subsequently synthesizing isocyanate by using the fractionated ingredient as a starting material.

It is preferable in the present invention that the crude material is obtained by decomposing rigid polyurethane foam made from a tolylene diisocyanate composition.

Accordingly, the tolylene diisocyanate-based rigid polyurethane foam used for a refrigerator insulator can be recycled easily on an industrial scale. Particularly, tolylenediamine-based polyetherpolyol can be synthesized from tolylenediamine as one of the fractionated ingredients after fractionating crude materials obtained by treatment with supercritical water or sub-critical water. Moreover, tolylene diisocyanate can be synthesized from the tolylene diamine. Materials for manufacturing rigid polyurethane foam can be recycled from scrapped refrigerators in this manner.

A method of manufacturing materials of the rigid polyurethane foam includes steps of:

shredding a scrapped refrigerator comprising rigid polyurethane foam in order to separate rigid polyurethane foam lumps, grinding the rigid polyurethane foam lumps into a rigid polyurethane foam powder, liquefying the rigid polyurethane foam powder by using either aminolysis reaction or glycolysis reaction, reacting the liquefied rigid polyurethane foam powder with either supercritical water or a sub-critical water in order to decompose the rigid polyurethane foam into a crude material, and synthesizing polyetherpolyol by addition polymerization between the crude material and ethylene oxide and/or propylene oxide.

Preferably in the present invention, the crude material is obtained by decomposing rigid polyurethane foam made from a diphenylmethane diisocyanate composition.

Accordingly, rigid polyurethane foam made from a composition of diphenylmethane diisocyanate, which is used for an insulator of a refrigerator, can be recycled on an industrial scale. More specifically, the present invention enables the synthesis of the polyol from an amine initiator obtained by a treatment with supercritical water or sub-critical water. This serves to recycle rigid polyurethane foam materials.

In the present invention, a method of manufacturing a refrigerator includes steps of:

shredding a scrapped refrigerator comprising rigid polyurethane foam in order to separate rigid polyurethane foam lumps, grinding the rigid polyurethane foam lumps into a rigid polyurethane foam powder, liquefying the rigid polyurethane foam powder by using either aminolysis reaction or glycolysis reaction, reacting the liquefied rigid polyurethane foam powder with either supercritical water or a sub-critical water in order to decompose the rigid polyurethane foam into a crude material, fractionating the crude material into a fractionated ingredient and a residue, mixing isocyanate prepared from the fractionated ingredient as an initiator, the residue, a surfactant agent, a catalyst and a foaming agent, injecting the mixture in a gap between an inner liner and an outer case of a refrigerator, and foaming and curing the mixture.

Preferably in the method, the rigid polyurethane foam is made from a tolylene diisocyanate composition.

Accordingly, materials obtained by decomposing and synthesizing rigid polyurethane foam can be reused, and thus, a refrigerator containing such rigid polyurethane foam can be recycled several times in order to serve for resource conservation.

In the present invention, a refrigerator is manufactured by mixing polyetherpolyol, a surfactant agent, a catalyst, a foaming agent and isocyanate, injecting the mixture in a gap between an inner liner and an outer case of the refrigerator and foaming-curing the mixture therein. The polyetherpolyol contains an ingredient of polyetherpolyol prepared by the following steps of:

shredding a scrapped refrigerator comprising rigid polyurethane foam in order to separate rigid polyurethane foam lumps, grinding the rigid polyurethane foam lumps into a rigid polyurethane foam powder, liquefying the rigid polyurethane foam powder by using either aminolysis reaction or glycolysis reaction, reacting the liquefied rigid polyurethane foam powder with either supercritical water or a sub-critical water in order to decompose the rigid polyurethane foam into a crude material, and subjecting the crude material to addition polymerization with ethylene oxide and/or propylene oxide.

Preferably, the rigid polyurethane foam is made from a composition of diphenylmethane diisocyanate.

In this way, polyetherpolyol can be obtained from rigid polyurethane foam made from a diphenylmethane diisocyanate composition used as a refrigerator insulator, and the polyetherpolyol can be reused as a material for rigid polyurethane foam. The thus obtained refrigerator serves for resource conservation and it is environmentally-friendly. Needless to say, such refrigerators can be recycled.

Furthermore, a refrigerator in the present invention is manufactured by filling rigid polyurethane foam, and the refrigerator is provided with a means such as a label to identify materials of the rigid polyurethane foam used as an insulator.

In the present invention, materials of rigid polyurethane foam contained in a scrapped refrigerator can be discriminated. Therefore, the materials can be separated from a scrapped refrigerator and recycled easily since it is possible to determine suitable methods for treating and manufacturing materials.

Preferably, the rigid polyurethane foam to be discriminated is manufactured by foaming a material containing at least one composition selected from a tolylene diisocyanate composition, a diphenylmethane diisocyanate composition, and a mixture thereof, and the material is identified on the color tones.

Accordingly, the material composition of rigid polyurethane foam contained in a scrapped refrigerator can be identified based on the color tones whether it is a tolylene diisocyanate composition, a diphenylmethane diisocyanate composition, or a mixture thereof. As a result, suitable methods for treating and manufacturing raw materials can be determined and recycling procedures can be simplified. In addition, this serves to prevent errors in treatment and manufacturing operations.

Preferably, a means for identifying materials is displayed or recorded on a seal cap covering an injection hole. Such a hole is formed on the outer case or on the backside of the refrigerator in order to inject a raw material of polyurethane.

Accordingly, recycling operations can be performed suitably and efficiently for every urethane material in recycling facilities. The identifying means will help operators to determine treatment of the rigid polyurethane foam.

A refrigerator according to the present invention contains an insulator of polyurethane foam manufactured from a material containing an ingredient prepared by any of the above-mentioned methods.

The present invention provides a resource-conservative refrigerator, since the rigid polyurethane foam material is obtained from a tolylene diisocyanate composition or a diphenylmethane diisocyanate composition as products of decomposition and synthesis of rigid polyurethane foam used for a refrigerator insulator. Due to the identifying means, the rigid polyurethane foam insulator contained in a scrapped refrigerator can be recycled easily.

Since polyetherpolyol obtained by re-synthesizing is reused for a rigid polyurethane foam material, the present invention can provide refrigerators serving for resource conservation. Moreover, the rigid polyurethane foam insulator contained in a scrapped refrigerator can be recycled due to the identification ability.

As mentioned above, the present invention provides a method of treating waste, and the method includes:
  a stage of shredding waste such as a refrigerator comprising rigid polyurethane foam,
  a stage of sorting the shredded waste into iron, non-ferrous metals, rubbers or the like,
  a stage of treating foamed insulator, and this stage includes a step of pulverizing rigid polyurethane foam lumps by using grinding means or compressing means;
  a stage of recycling, and this stage includes liquefying the rigid polyurethane foam powder by using aminolysis reaction or glycolysis reaction, filtering the liquefied rigid polyurethane foam powder to remove impurities such as resin fragments and metallic fragments and subsequently decomposing the material of the rigid polyurethane foam into amines and starting compound of rigid polyurethane foam by using reaction with supercritical water or sub-critical water.

DETAILED DESCRIPTION OF THE INVENTION

The present invention relates to a process for discriminating a raw material of rigid polyurethane foam used in a refrigerator and for recycling the polyurethane foam suitably. More specifically, the present invention serves to recycle waste suitably for every rigid polyurethane foam material in order to improve the recycling rate concerning scrapped refrigerators and to help resource conservation. Since raw materials of rigid polyurethane foam used in scrapped refrigerators can be identified, suitable methods for treating and manufacturing can be selected, and this facilitates recycling.

Embodiments for refrigerators of the present invention will be described below with reference to FIGS. 1–6.
(First Embodiment)

Figure 1:
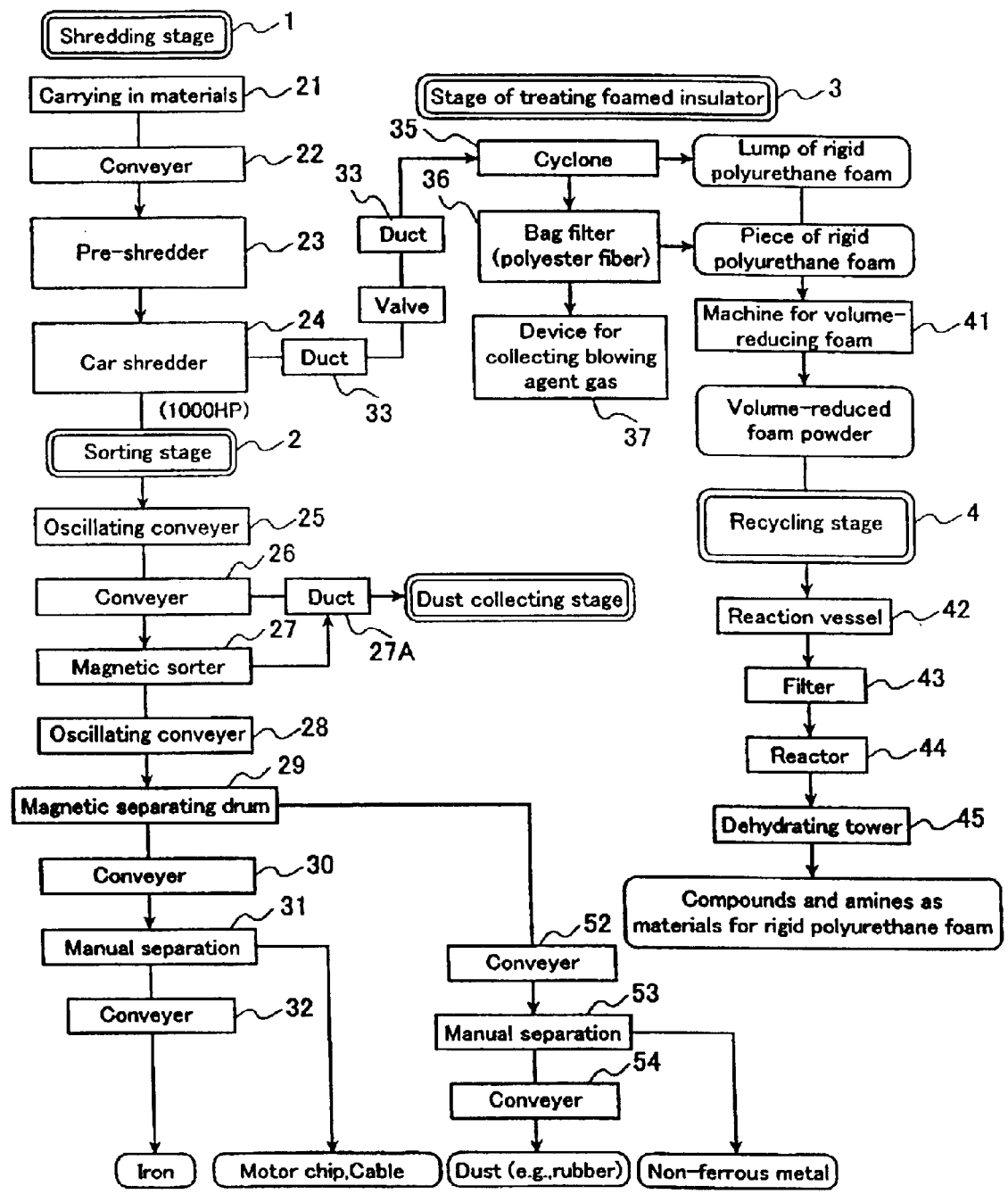
FIG. 1 is a flow chart showing a process of a First Embodiment of the present invention.

FIG. 1 is a flow chart to show a process of treating waste in a First Embodiment of the present invention.

First, a process of treating waste will be explained below. Waste is carried in through an inlet 21 (carrying in materials) of a shredding stage 1 and shredded before being transported to a sorting stage 2. In this sorting stage 2, the waste is classified into heavy and light wastes, each of them is separated further and recovered. In a stage 3 of treating foamed insulator, foaming gas and rigid polyurethane foam contained in a refrigerator are recovered. Next, the discharged rigid polyurethane foam is transported to a recycling stage 4, and decomposed into amines and compounds of rigid polyurethane foam.

The treatment will be explained in detail by referring to FIG. 1. In FIG. 1, waste that is fed into a waste-treating facility is carried into the shredding stage 1 through an inlet 21. For a refrigerator, a refrigerant in the freezer is removed in advance. Then the waste is transported via a conveyor 22 to a pre-shredder 23.

The waste is roughly shredded in the pre-shredder 23, and fed to a uniaxial car shredder 24 having an output of about 1000 HP in order to be shredded finely.

During the sorting stage 2, an oscillating conveyor 25 arranged below the outlet of the car shredder 25 is used to separate light waste from iron, non-ferrous metals and rubbers before the waste is further transported by a belt conveyor 26.

Waste containing ferrous metals is separated from the remainder by a magnetic sorter 27, an oscillating conveyor 28 and a magnetic separating drum 29.

In a following step, lightweight dust generated due to the operations of the conveyor 26 and of the magnetic sorter 27 is collected by a duct 27A and transported to be subjected to a dust collecting stage.

The waste separated by the magnetic separating drum 29 is transported by a conveyer 30. The waste is subjected to manual separation 31 on the conveyer 30 into iron and the remainder such as motor chips and cables. Iron that is selected by hand (31) is transported by a conveyer 32 to a truck. Wastes such as motor chips and cables are separated by hand.

After the separation by the magnetic separating drum 29, wastes that do not include any ferrous metals are transported by conveyers 52 and 54. Non-ferrous metals are separated by hand (53) during the waste is transported by the conveyers 52, 54 and the remaining waste that contains dust such as rubbers is separated and collected.

Rigid polyurethane foam that has been separated in the shredding stage 1 passes through a duct 33 in order to be aspirated by a cyclone 35 in a stage 3 of treating foamed insulator. The cyclone 35 separates and collects comparatively large lumps of rigid polyurethane foam. Foaming agent (blowing agent) gas in the rigid polyurethane foam passes through a bag filter 36, and is recovered by a collecting device 37. Fragments of the rigid polyurethane foam are caught by the bag filter 36.

The lumps and fragments of rigid polyurethane foam are then fed to a machine 41 for volume-reducing. The machine 41 is composed of a press and a screw compressor. The machine 41 grinds and pulverizes the lumps and fragments of the rigid polyurethane foam by using shearing force at a time of compression in order to reduce the volume of the rigid polyurethane foam. Since a foaming agent gas is dissolved in the rigid polyurethane foam, the rigid polyurethane foam is heated at a temperature from 20 to 150° C. or preferably, 90 to 130° C. under an atmospheric pressure at a time of compressive grinding in order to evaporate and recover the gas efficiently.

There is no specific limitation on the size or shape of a rigid polyurethane foam powder in the present invention. In general, the average particle diameter ranges from 1 $\mu$m to 3 mm. Preferably, the diameter ranges from 1 $\mu$m to 1 mm, and more preferably, from 1 $\mu$m to 500 $\mu$m. An average particle diameter of less than 1 $\mu$m is unfavorable from an economic viewpoint since the particle is difficult to be divided further on an industrial scale. When the average particle diameter exceeds 3 mm, liquefaction efficiency is lowered due to the decreased specific surface area.

The rigid polyurethane foam pulverized in the stage 3 is fed to a reaction vessel 42. In a recycling stage 4, the pulverized rigid polyurethane foam is liquefied in the reaction vessel 42 by a glycolysis or aminolysis reaction operation. In the operation, the rigid polyurethane foam is mixed with additives and heated. The additives include, for example, ethylene glycol, propylene glycol, monoethanolamine and tolylenediamine. Each additive can be used alone or as a mixture with other additives, and the mixing ratio can be determined arbitrarily.

In the glycolysis reaction or aminolysis reaction, the mixing ratio of the rigid polyurethane foam powder to the additives is 1:0.4 to 1:5.0 by weight. A preferable ratio is 1:0.5 to 1:3.0. When the additive content is less than 0.4, efficient liquefaction will not be obtainable. When the content exceeds 5.0, a large reactor will be required. Moreover, since the ratio of polyurethane waste is lowered, the energy efficiency for treating waste per volume deteriorates in a supercritical/sub-critical decomposition in the following stage. The reaction is performed under an atmospheric pressure at a temperature ranging from 100 to 250° C., or preferably, ranging from 150 to 200° C. Though the reaction period is typically from 1 to 12 hours, it differs depending on some factors such as reaction temperatures, variations of rigid polyurethane foam and additives, and the mixing ratios. For facilitating the reaction, a catalyst such as metallic compounds, e.g., barium acetate and thallium acetate, or an acidic catalyst can be used, and such a catalyst can be used alone or with other catalysts.

After particles of impurities are removed by a filter 43, the mixture of rigid polyurethane foam is introduced into a reactor 44 together with high temperature-and-high pressure water and retained under a supercritical or sub-critical condition for about 5 minutes to 1 hour in order to promote a separation reaction. The water is added in a volume ratio of 0.4–5.0, or preferably 0.5–3.0 to the liquefied rigid polyurethane foam powder obtained in the glycolysis and/or aminolysis reaction. When the water content ratio is less than 0.4, the fluidity will be insufficient, and this will hinder efficient decomposition. When the ratio exceeds 5.0, the efficiency deteriorates since the decomposition efficiency is close to saturation. In addition to that, since it requires a large reactor, the energy amount for a subsequent dehydration is increased. The reaction pressure range is from 10 to 25 MPa, or preferably, from 18 to 22 MPa. The reaction temperature range is from 190 to 400° C., or preferably, from 250 to 350° C. There is no specific limitation on means for filtering the fragments of impurities, but any suitable methods of known techniques can be used.

The liquefied rigid polyurethane foam powder discharged after the separation reaction is fed to a dehydrating tower 45 to remove water, carbon dioxide or the like, so that amines and a compound of a rigid polyurethane foam material are obtained.

(Second Embodiment)

Figure 2:
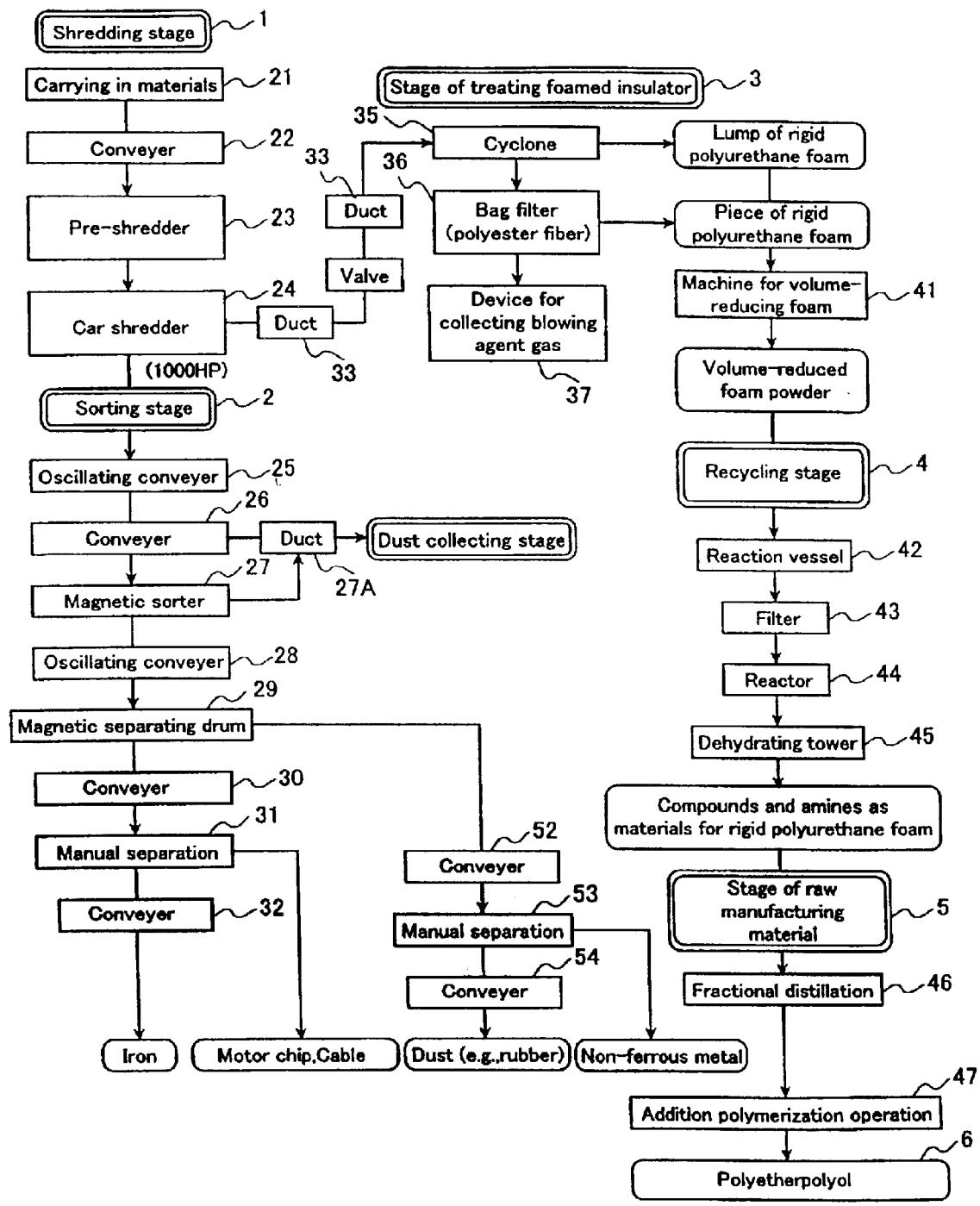
FIG. 2 is a flow chart showing a process of a Second Embodiment of the present invention.

FIG. 2 is a flow chart to show a method of manufacturing a raw material according to this embodiment of the present invention.

A process of treating waste is explained below. Further explanation is omitted for treatments corresponding to those of the First Embodiment.

In this embodiment, waste is a scrapped refrigerator or the like containing rigid polyurethane foam, and the rigid polyurethane foam is made from a diphenylmethane diisocyanate composition. First, the waste is fed to a shredding stage 1 and subsequently to a sorting stage 2. In the sorting stage 2, the shredded waste is classified into heavy waste and light waste, and further separated into materials to be recovered. In a stage 3 of treating foamed insulator, rigid polyurethane foam and foaming gas contained in a refrigerator are recovered.

In a recycling stage 4, the rigid polyurethane foam is mixed with ethylene glycol and heated to be liquefied. The liquefied rigid polyurethane foam powder is filtered to remove particles of impurities and then it is decomposed at a temperature of 260° C. under a pressure of 20 MPa. Subsequently, water is evaporated and a raw material compound (polyetherpolyol) of rigid polyurethane foam and amines (e.g., p-methylenedianiline) are created as a result of decomposition. Aromatic amines created by the decomposition are then treated by a system 47 for addition polymerization with ethylene oxide and/or propylene oxide, so that polyetherpolyol having an OH value of 450 mgKOH/g is produced.

The method of adding ethylene oxide and/or propylene oxide is not specifically limited, but other known methods can be used suitably.

The OH value of the polyetherpolyol is not specifically limited. Considering the hardness of rigid polyurethane foam or some other factors, the OH value is preferably from 160 to 935 mgKOH/g when a diphenylmethane diisocyanate composition is used.

In the method of manufacturing refrigerators, rigid polyurethane foam can be manufactured from recycled polyetherpolyol together with newly-added polyetherpolyol. The content ratio can be decided arbitrarily, however, it is preferable that recycled polyetherpolyol is included in an amount of at least 30 wt %, or 50 wt % to the entire polyol in view of resource conservation.

The polyetherpolyol that can be added to the recycled polyetherpolyol is selected from, for example, compounds that are produced by adding certain amounts of ethylene oxide, propylene oxide or styrene oxide to at least one polyfunctional alcohol or polyfunctional amine. The compounds can have blocked end groups. The polyfunctional alcohol is selected from, for example, ethylene glycol, diethylene glycol, triethylene glycol, trimethylene glycol, 1,3-butylene glycol, tetramethylene glycol, glycerol, sorbitol, sucrose, and bisphenol A. The polyfunctional amine is selected from, for example, ethylenediamine, diethylenetriamine, piperazine, ethanolamine, and propanolamine. These polyfunctional alcohols and polyfunctional amines can be mixed for adjusting viscosity at a time of manufacturing rigid polyurethane foam.

(Third Embodiment)

Figure 3:
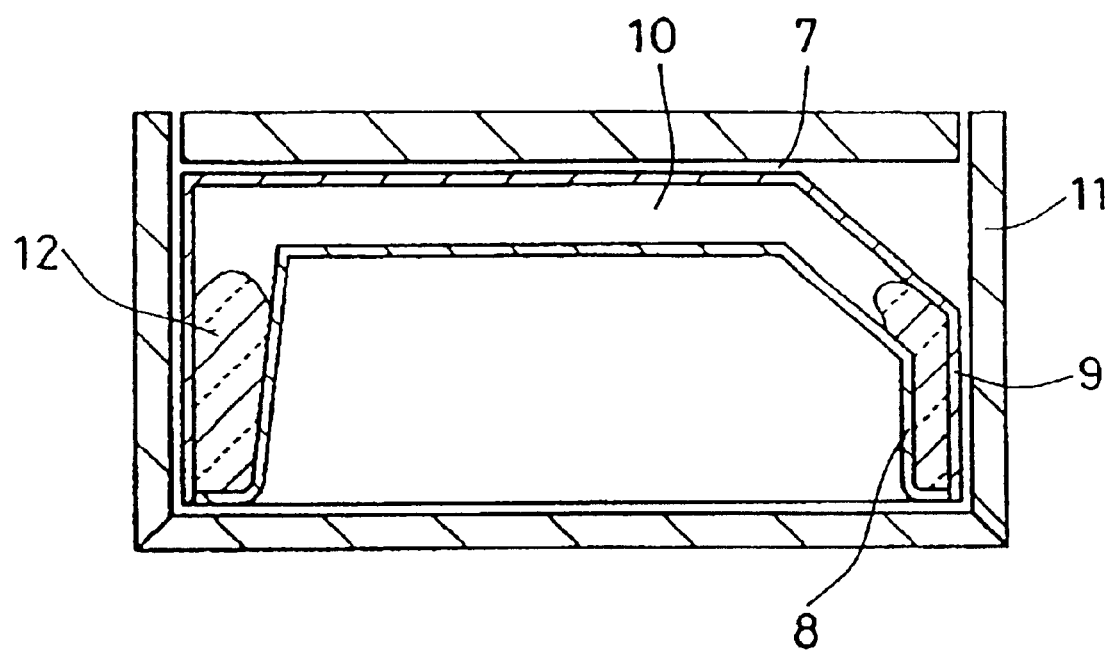
FIG. 3 is a cross-sectional view showing an insulator cabinet during a process of manufacturing a refrigerator according to a Third Embodiment of the present invention.
Figure 4:
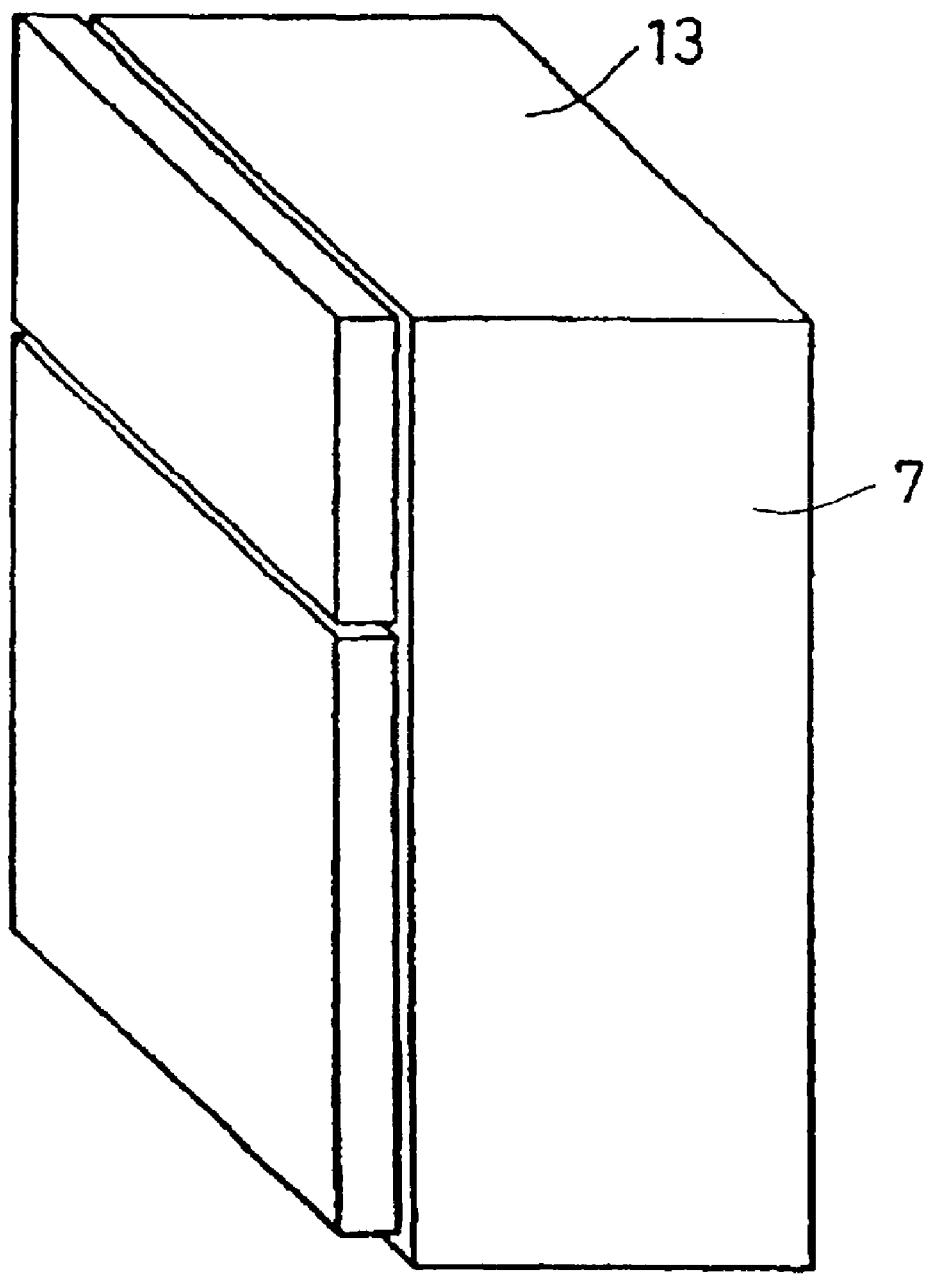
FIG. 4 is a perspective view of a refrigerator of the Third Embodiment of the present invention.

FIG. 3 is a cross-sectional view showing an insulator cabinet in a process of manufacturing a refrigerator in this embodiment, and FIG. 4 shows a perspective view of a refrigerator including the insulator cabinet. In FIG. 3, 7 denotes an insulator cabinet composed of an inner liner 8 and an outer case 9. A rigid polyurethane foam material is injected in a space 10 inside the insulator cabinet 7, then the insulator cabinet 7 is housed in a jig 11 so that the material of rigid polyurethane foam is reacted and cured at a temperature from 35 to 60° C. for 6 minutes. Subsequently, the foamed material is taken out from the jig 11 and assembled with other members to make a refrigerator.

For manufacturing rigid polyurethane foam 12, a premix is prepared by mixing 100 weight parts of polyetherpolyol (OH value: 450 mgKOH/g) obtained in the Second Embodiment with 3 weight parts of a catalyst, 3 weight parts of a surfactant agent, 20 weight parts of foaming agent (cyclopentane), and 0.5 weight parts of a reaction adjusting agent (formic acid), and subsequently machine-mixing with c-diphenylmethane diisocyanate or with p-diphenylmethane diisocyanate. Here, the catalyst is "Kaoriser No. 1" supplied by Kao corp., and the surfactant agent is a silicone-based "F-317" supplied by Shin-Etsu Chemical Co., Ltd. After integral foaming of the rigid polyurethane foam 12, the insulator cabinet is assembled with freezing system members such as a compressor and a condenser (not shown) and some other plastic interior members (not shown) so that a refrigerator 13 is provided. The rigid polyurethane foam is injected in a cabinet of a refrigerator in a condition as shown in FIG. 3. The right-hand region in FIG. 3 corresponds to the bottom while the left-hand corresponds to the top of a refrigerator in use.

(Fourth Embodiment)

Figure 5:
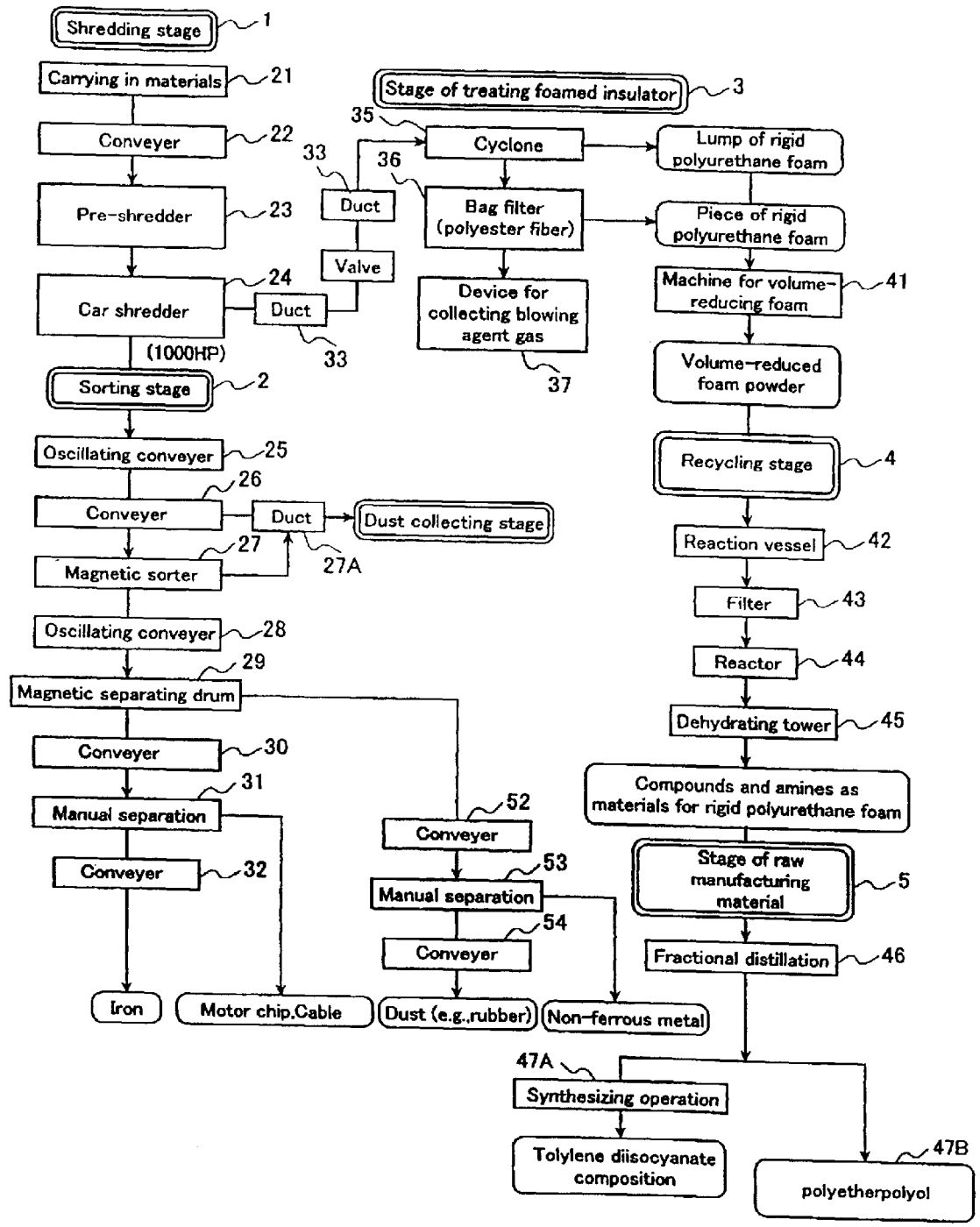
FIG. 5 is a flow chart showing a process of a Fourth Embodiment of the present invention.

FIG. 5 is a flow chart to show a method of preparing raw materials according to a Fourth Embodiment of the present invention.

A process of treating waste is explained below. Further explanation is omitted for treatments corresponding to those of First and Second Embodiments.

In this embodiment, the waste is a scrapped refrigerator including rigid polyurethane foam produced by foaming a tolylene diisocyanate composition. This waste is treated in the same manner as described in the First Embodiment, mixed with ethylene glycol and heated in a recycling stage 4. Then, the waste is filtered to remove particles of impurities and decomposed at 260° C., 20 MPa, so that amines (p-tolylenediamine) and a starting compound (polyetherpolyol) of rigid polyurethane foam are produced. Subsequently, water is evaporated.

In a following stage 5 of manufacturing raw materials, the decomposition product, i.e., a residue of water removal, is fractionated by a fractional distillation means 46 in order to obtain some ingredients such as tolylenediamine. From the tolylenediamine, tolylene diisocyanate is synthesized in a well-known method using a synthesizing system 47A. Polyetherpolyol (residue) is used as it is to manufacture rigid polyurethane foam (system 47B).

The OH value of the polyetherpolyol is not specifically limited. In point of view of hardness of rigid polyurethane foam to be manufactured, the OH value is preferably from 380 to 500 mgKH/g when tolylene diisocyanate is used.

Alternatively, the fractionated ingredient (tolylenediamine) can be used as a starting material to be fed to addition polymerization system 47 (FIG. 2) with ethylene oxide and/or with propylene oxide. The thus obtained amine-based polyol can be used for manufacturing rigid polyurethane foam according to the present invention.

(Fifth Embodiment)

Figure 6:
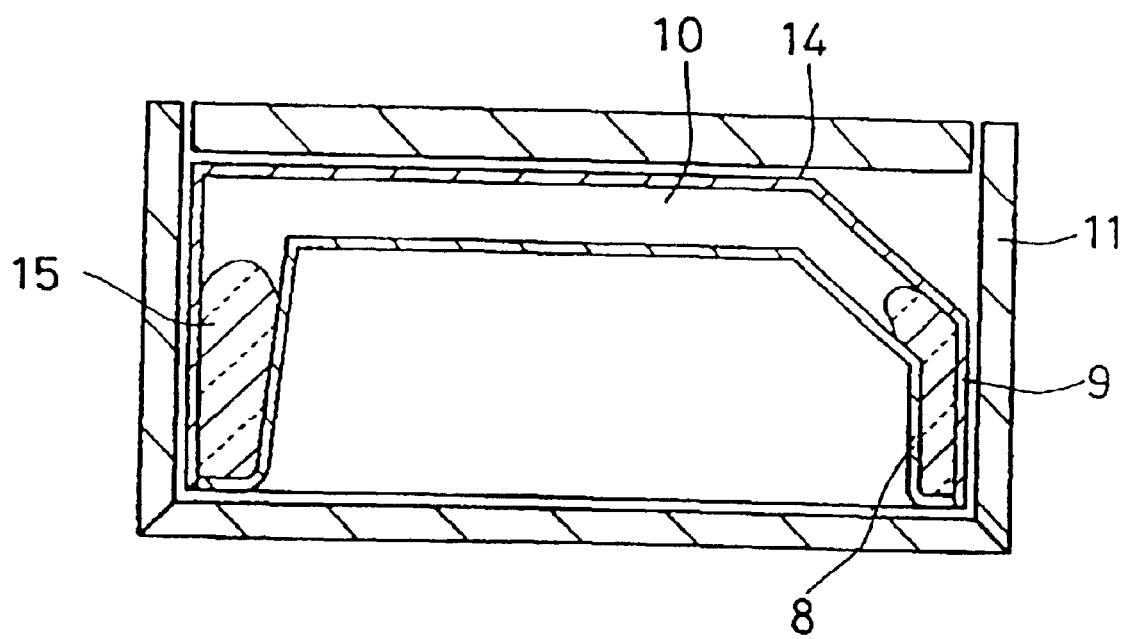
FIG. 6 is a cross-sectional view showing an insulator cabinet during a process of manufacturing a refrigerator according to the Fourth Embodiment of the present invention.
Figure 7:
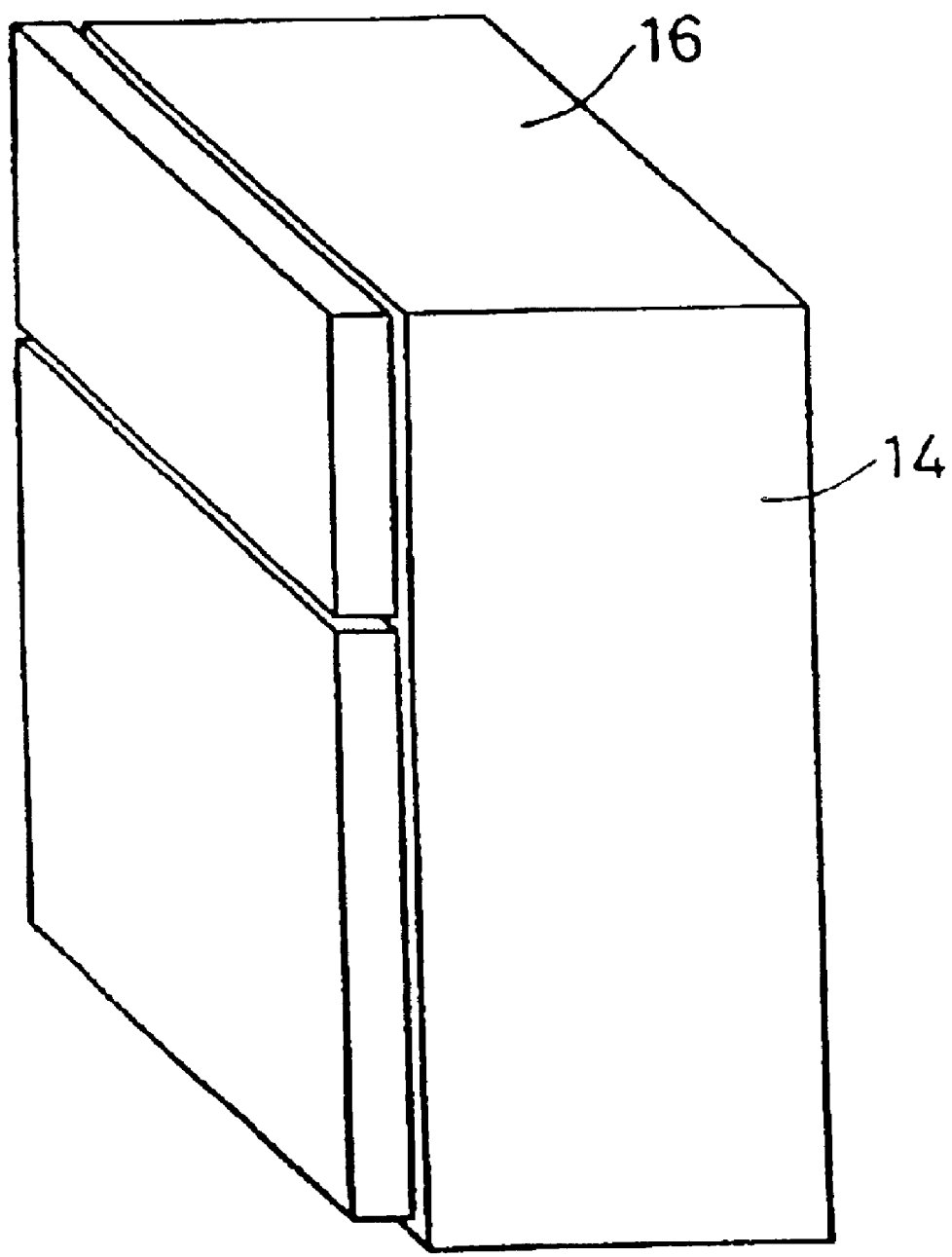
FIG. 7 is a perspective view of a refrigerator according to a Fifth Embodiment of the present invention.

FIG. 6 is a cross-sectional view showing an insulator cabinet in a process of manufacturing a refrigerator according to this embodiment, and FIG. 7 shows a perspective view of a refrigerator including the insulator cabinet. In FIG. 6, 14 denotes an insulator cabinet composed of an inner liner 8 and an outer case 9. A rigid polyurethane foam material is injected in a space 10 inside the insulator cabinet 7, then the insulator cabinet 7 is housed in a jig 11 so that the material of rigid polyurethane foam is reacted and cured at a temperature from 35 to 60° C. for 8 minutes. Subsequently, the foamed material is taken out from the jig 11 in order to be assembled with other members to make a refrigerator.

For a raw material of rigid polyurethane foam, a premix is prepared by mixing 135 weight parts of tolylene diisocyanate and 100 weight parts of a residue (polyetherpolyol having OH value of 450 mgKOH/g) with 3 weight parts of a catalyst, 3 weight parts of a surfactant agent, 20 weight parts of a foaming agent (cyclopentane) and 0.5 weight parts of a reaction adjusting agent (formic acid). The premix is mixed by a machine to produce rigid polyurethane foam 15. The catalyst and the surfactant agent are the same as described in the Third Embodiment. After integral foaming of the rigid polyurethane foam, the insulator cabinet 14 is assembled with freezing system members such as a compressor and a condenser (not shown) and some other plastic interior members (not shown) so that a refrigerator 16 is provided.

(Sixth Embodiment)

Figure 8:
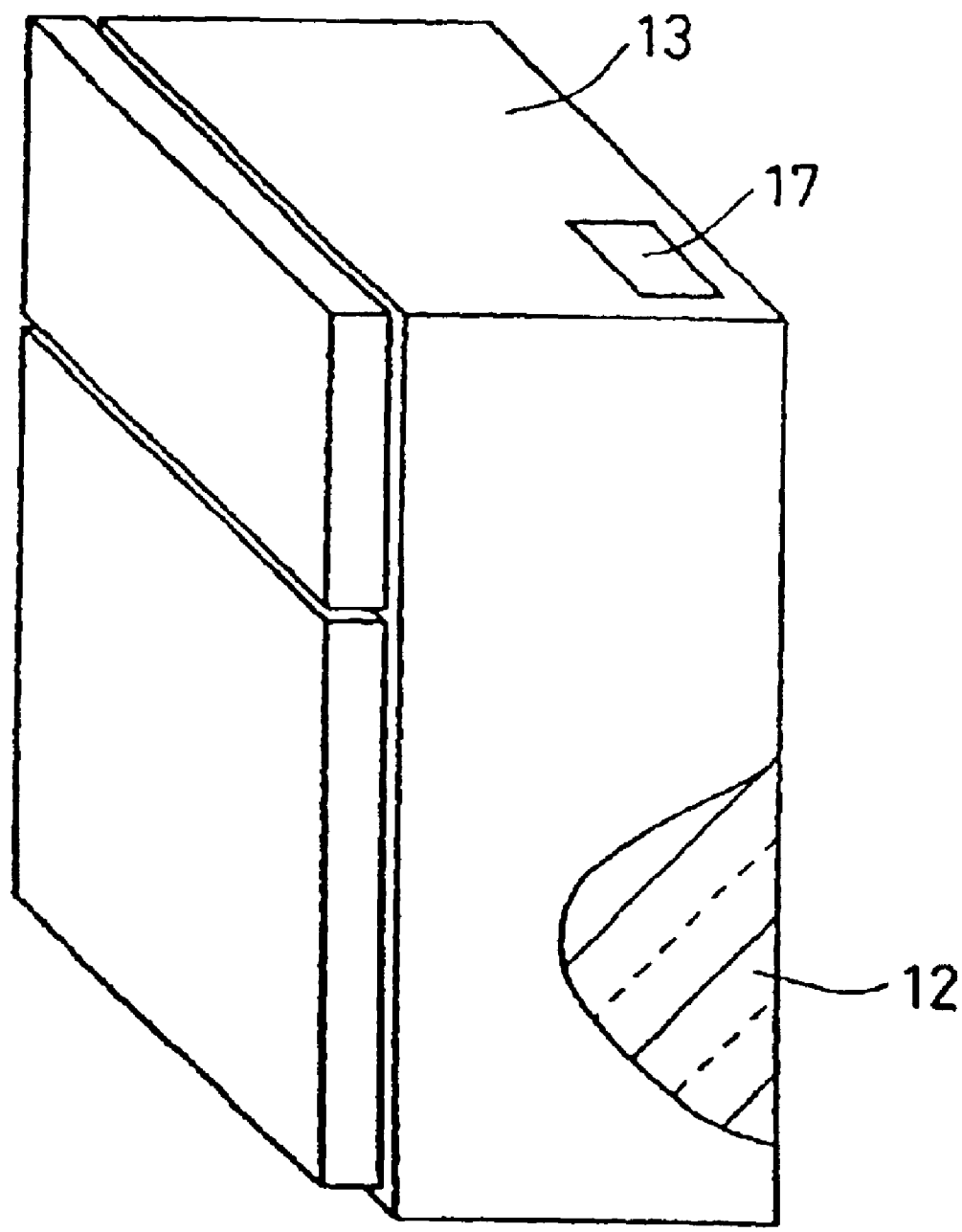
FIG. 8 is a perspective and partially cutaway view of a refrigerator according to a Sixth Embodiment of the present invention.
Figure 9:
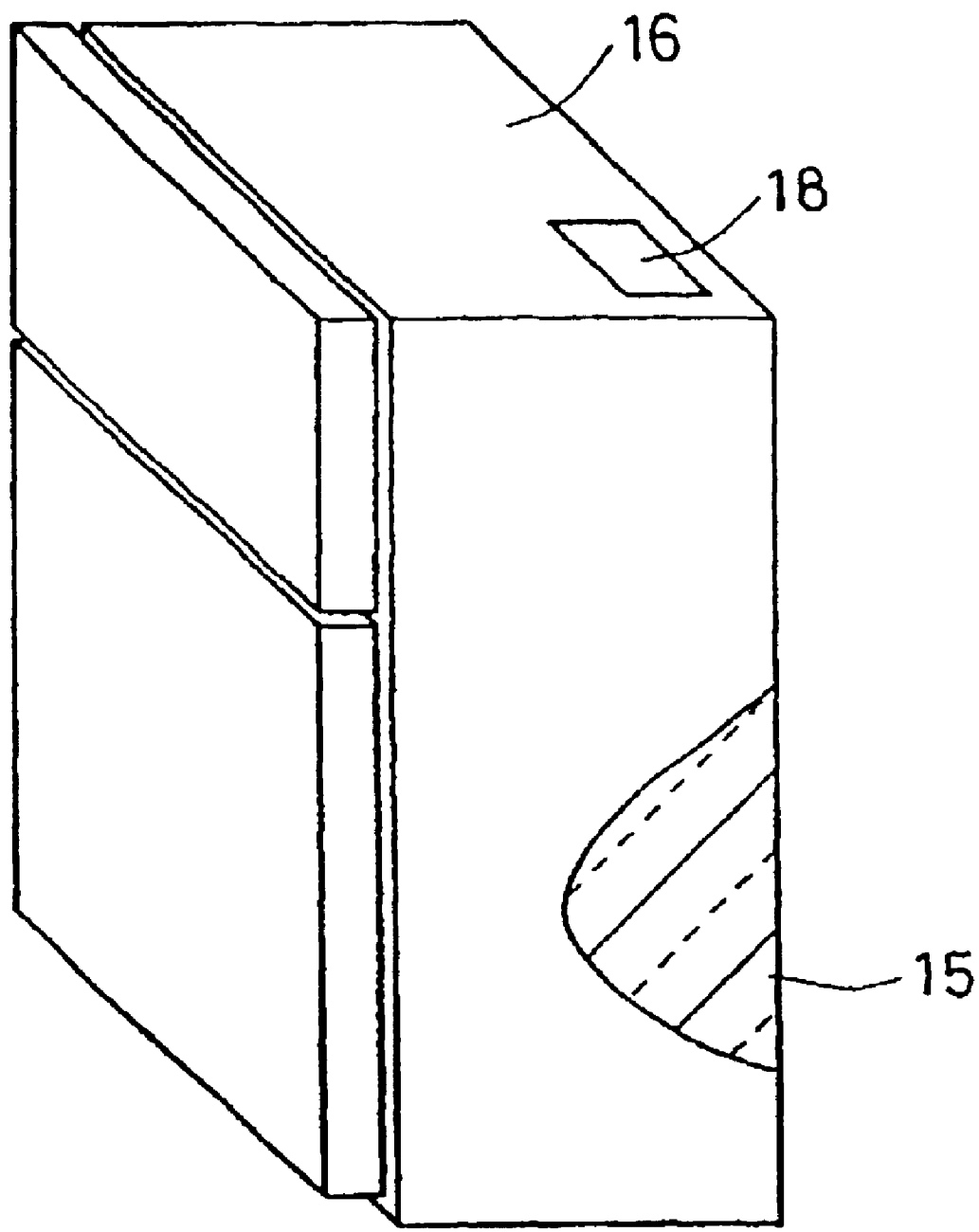
FIG. 9 is a perspective and partially cutaway view of another refrigerator according to the Sixth Embodiment.

FIGS. 8 and 9 show refrigerators according to this embodiment. In FIGS. 8 and 9, numeral 13 and 16 denote refrigerators comprising insulators of rigid polyurethane foam 12 and 15 respectively. The rigid polyurethane foam 12 is made from a diphenylmethane diisocyanate composition, while the rigid polyurethane foam 15 is made from a tolylene diisocyanate composition. Numeral 17 and 18 denote display labels stuck on the outer cases of the refrigerators, and these labels indicate the materials of the rigid polyurethane foam.

The display labels 17 and 18 can be records such as smart media and bar codes, so that the recorded information can be read to select a suitable method of treating the rigid polyurethane foam when the refrigerator is shredded.

In the present invention, various means can be applied to identify raw materials of rigid polyurethane foam contained in refrigerators, such as attaching either a display label or a bar code, though the means is not specifically limited. The materials can be identified depending on the color tones, and identification on color tones is most preferred in the present invention. The color tone identification is not limited to only the natural color of the raw materials, but pigment can be added to the rigid polyurethane foam.

It is preferable that the identifying means is displayed or recorded on the outer case of the refrigerator, especially in a back area of a top plate or on a seal cap of an injection hole formed in the backside of a refrigerator, since rigid polyurethane foam as an insulator is arranged in the backside of a typical refrigerator. An identifying means applied to a front part or a door of the refrigerator can be lost, since the door often is taken off from the refrigerator body during a shredding stage. Moreover, sensor functions for identification can be hindered since stickers may be applied on side panels or on the front part of the top plate in a home use. When an identifying means is provided in the interior of the refrigerator, an interior search sensor will be required, and this will make the identification difficult. On the other hand, the backside of a refrigerator is positioned in the vicinity of a wall, so that the identifying means in most cases can be retained in the original state. Therefore, there is no substantial risk of hindrance for the sensor function.

The identifying means in the present invention is not limited to those for identifying a tolylene diisocyanate composition, a diphenylmethane diisocyanate composition and a mixture thereof. The means is provided by varying color tones to indicate raw materials of rigid polyurethane foam and to help waste treatment.

(Seventh Embodiment)

Figure 10:
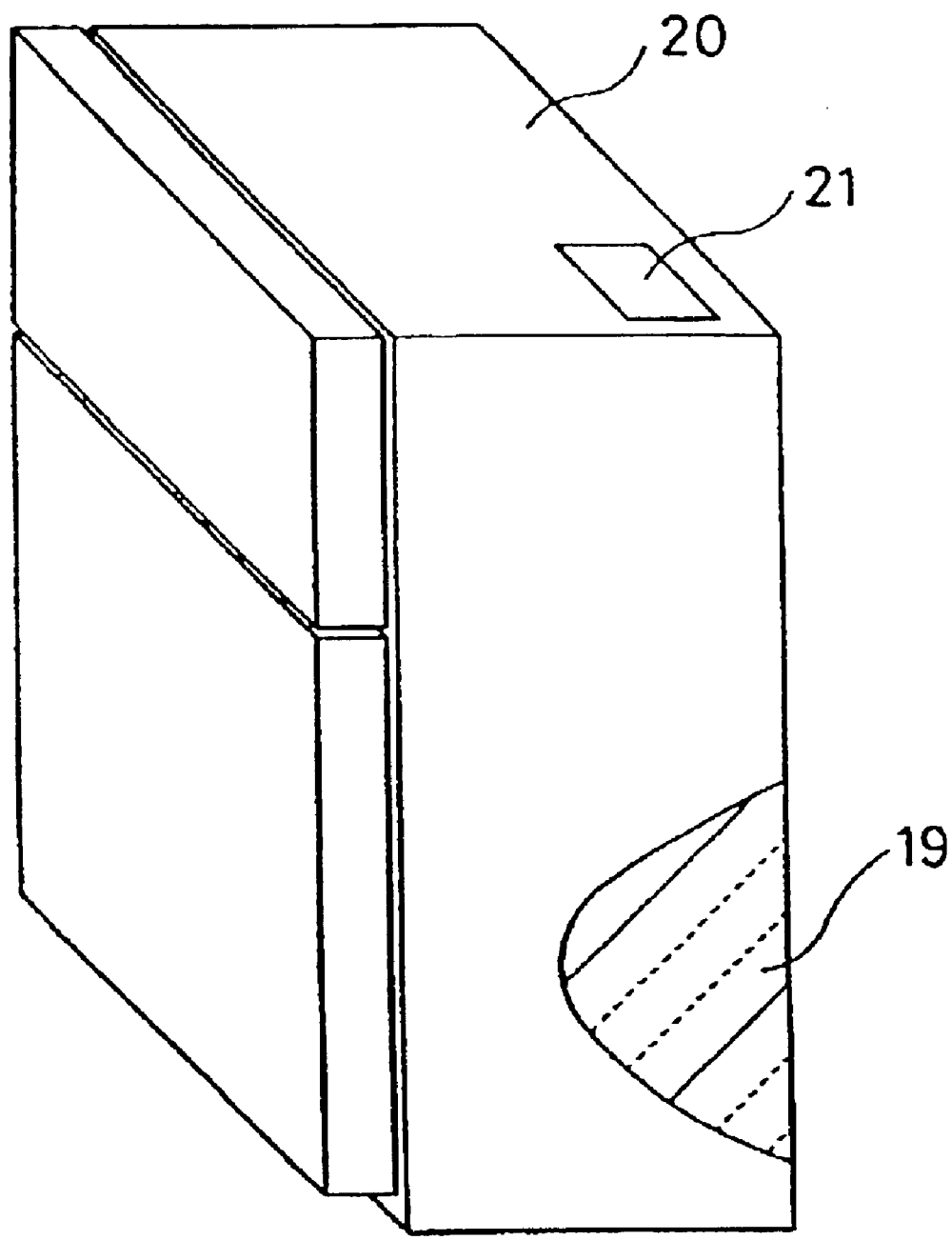
FIG. 10 is a perspective view of a refrigerator according to a Seventh Embodiment of the present invention.

FIG. 10 shows a refrigerator 20 provided with a means to indicate that the refrigerator includes rigid polyurethane foam made from a tolylene diisocyanate composition according to the present invention. The refrigerator 20 is manufactured by injecting rigid polyurethane foam 19 made of a tolylene diisocyanate composition, and a display label 21 to indicate use of the tolylene diisocyanate composition is attached to the refrigerator 20.

(Eighth Embodiment)

Figure 11:
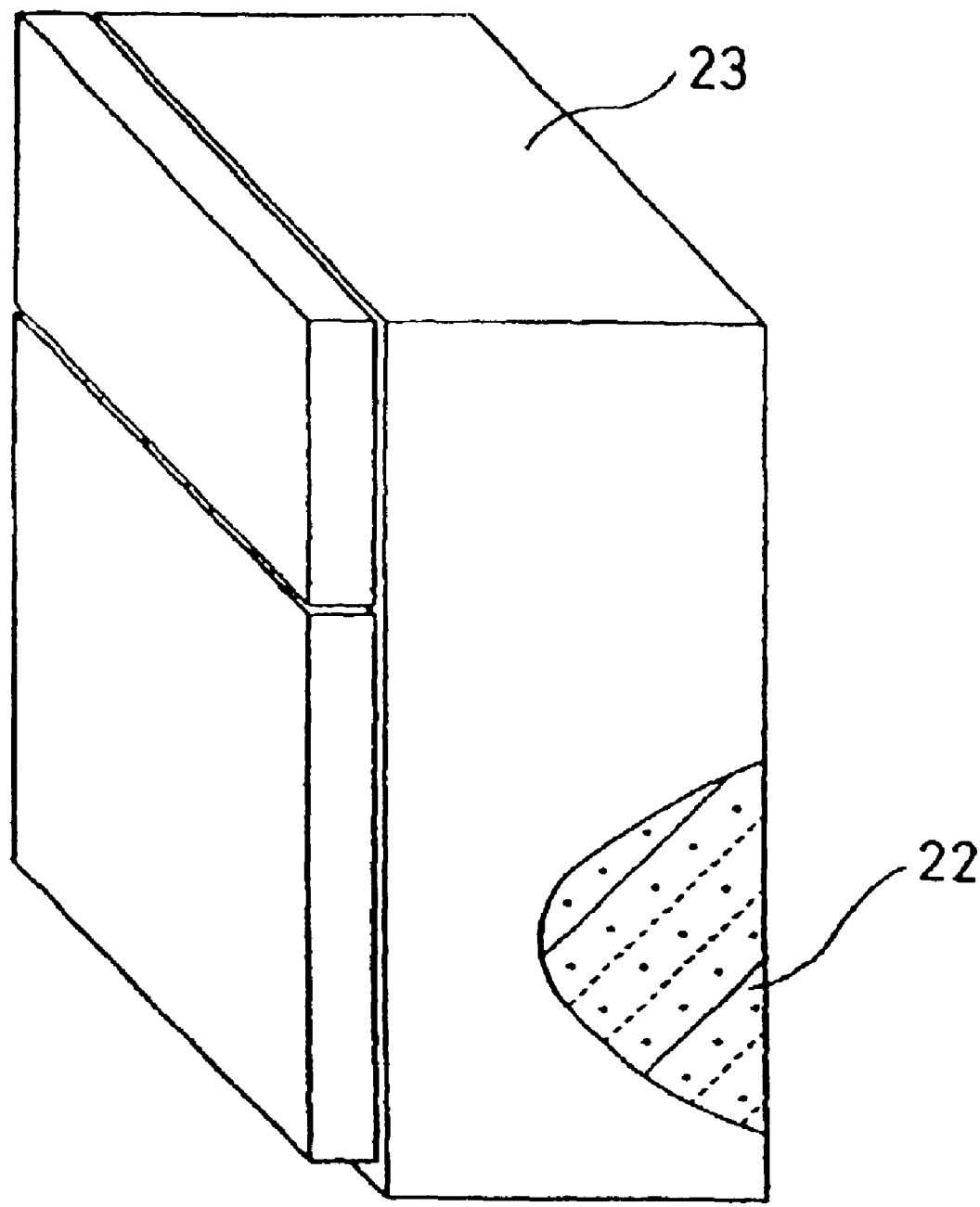
FIG. 11 is a perspective view of a refrigerator according to an Eighth Embodiment of the present invention.

FIG. 11 shows a refrigerator 23 provided with a means to indicate that the refrigerator includes rigid polyurethane foam made from a diphenylmethane diisocyanate composition according to the present invention. Rigid polyurethane foam 22 injected and molded to manufacture the refrigerator 23 in FIG. 11 is colored with a pigment or the like to indicate that a diphenylmethane diisocyanate composition is used.

(Ninth Embodiment)

Figure 12:
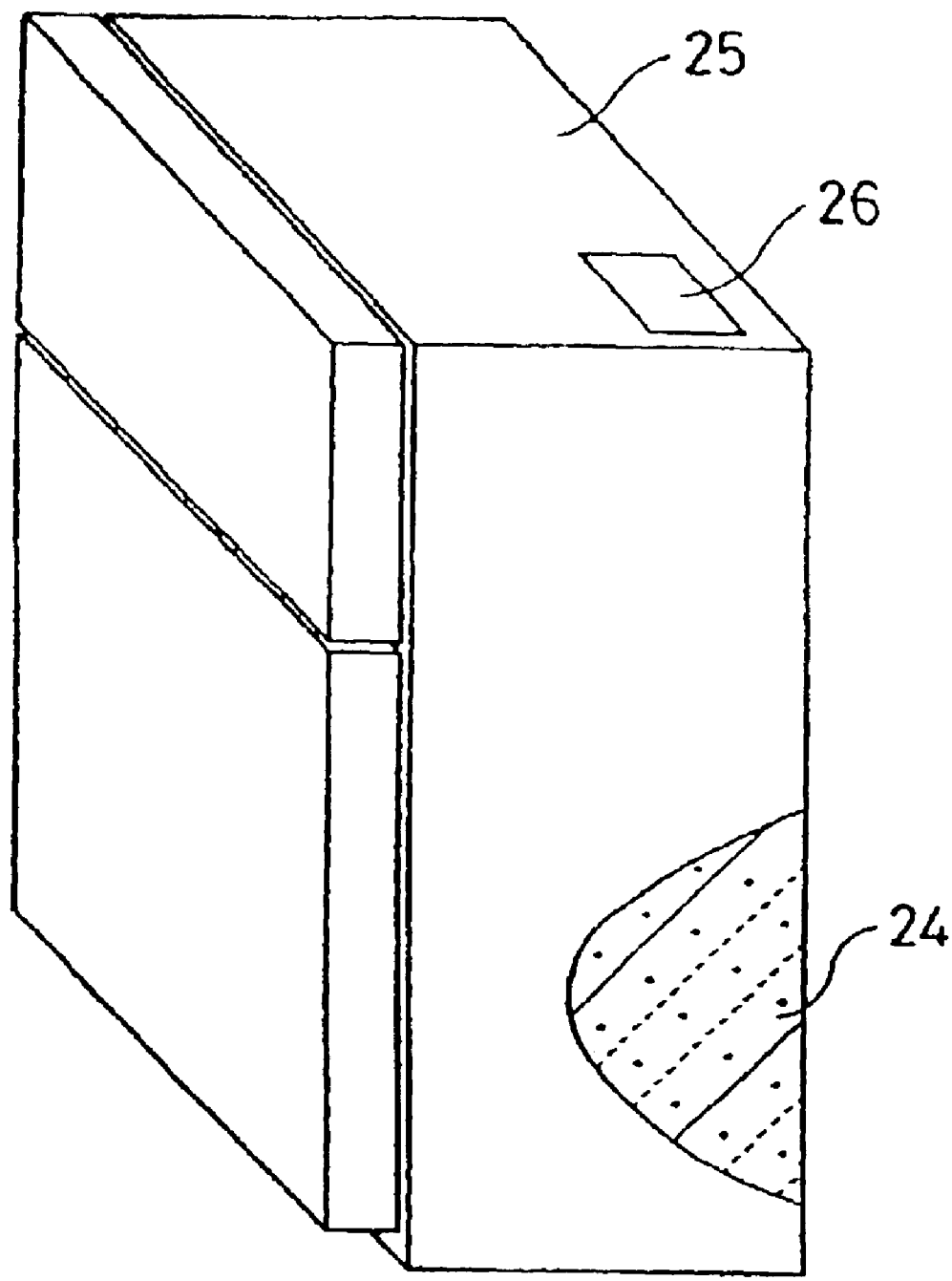
FIG. 12 is a perspective view of a refrigerator according to a Ninth Embodiment of the present invention.

FIG. 12 shows a refrigerator 25 provided with a means to indicate that the refrigerator includes rigid polyurethane foam made from a tolylene diisocyanate composition and a diphenylmethane diisocyanate composition according to the present invention. The refrigerator 25 is manufactured by injecting and molding rigid polyurethane foam 24 made of a tolylene diisocyanate composition and a diphenylmethane diisocyanate composition, and a display label 26 to indicate use of the tolylene diisocyanate composition is attached to the refrigerator 25. Furthermore, the rigid polyurethane foam 24 is colored with a pigment or the like to indicate that a tolylene diisocyanate composition and a diphenylmethane diisocyanate composition are used.

(Tenth Embodiment)

Figure 13:
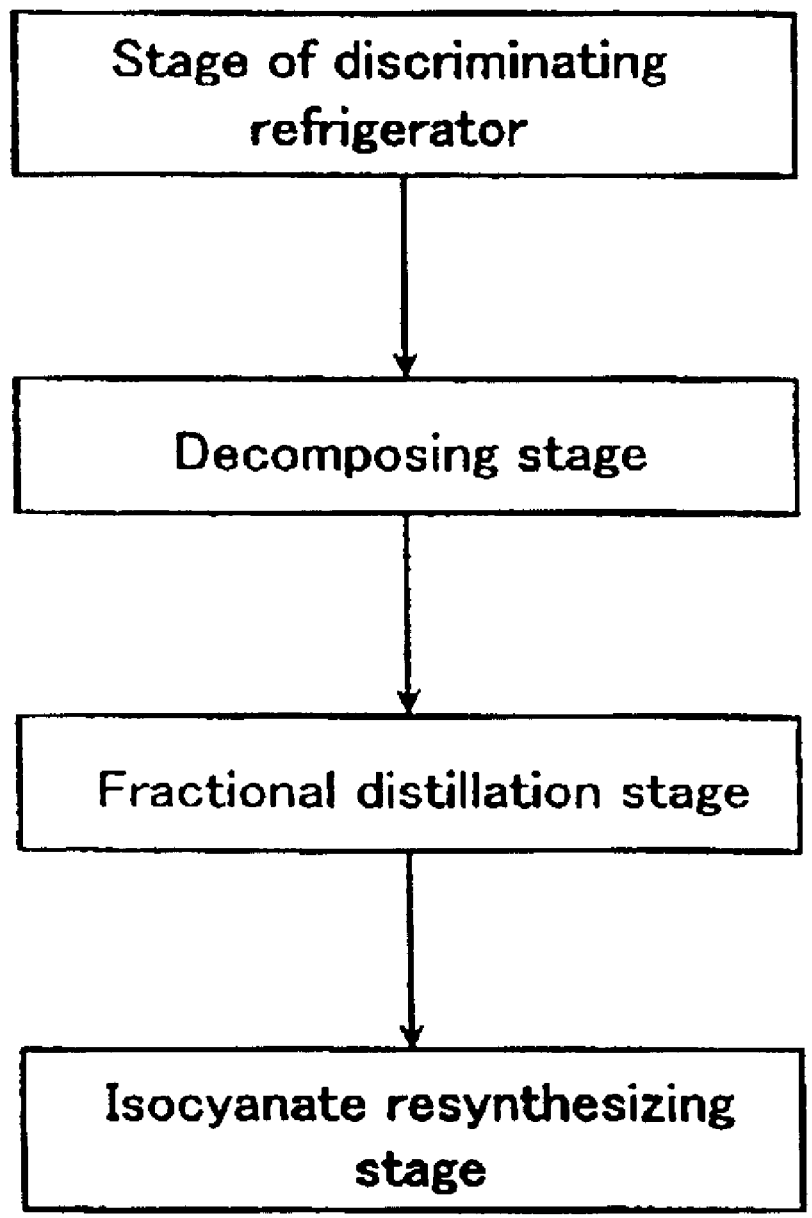
FIG. 13 is a flow chart showing a process of a Tenth Embodiment of the present invention.

FIG. 13 is a flow chart showing a process of a Tenth Embodiment of the present invention. The process comprises a stage of discriminating refrigerators manufactured by filling rigid polyurethane foam of a tolylene diisocyanate composition; a stage of decomposing the rigid polyurethane foam into a starting compound and amines by a chemical treatment in supercritical or sub-critical water; a stage of fractionating thus obtained amines for separating the amines from the material compound; and a stage of re-synthesizing a tolylene diisocyanate compound from tolylenediamine (a main ingredient of the amines).

(Eleventh Embodiment)

Figure 14:
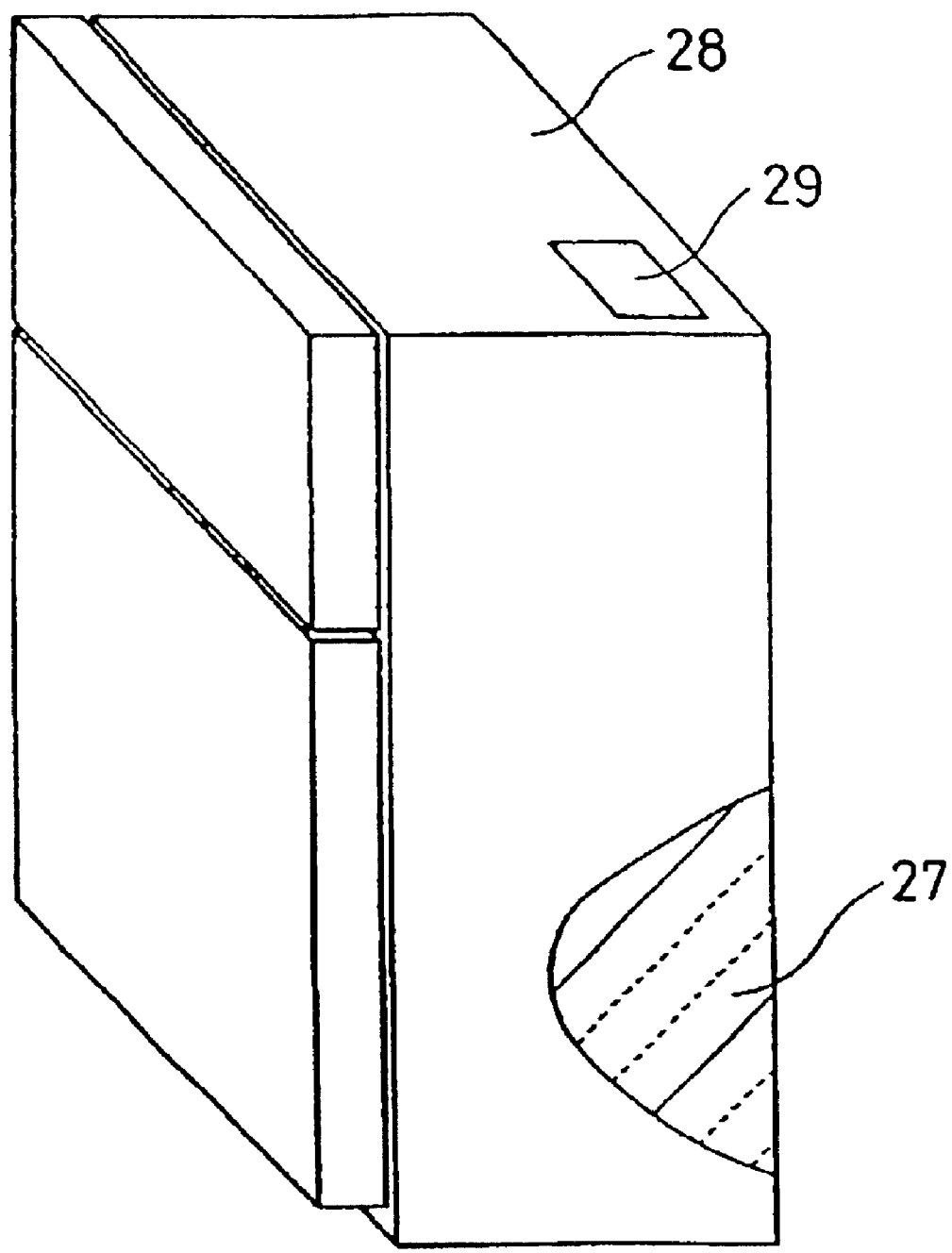
FIG. 14 is a perspective view of a refrigerator according to an Eleventh Embodiment of the present invention.

FIG. 14 is a perspective view of a refrigerator 28 according to an Eleventh Embodiment of the present invention. The refrigerator 28 has an insulator of rigid polyurethane foam 27. The rigid polyurethane foam 27 contains polyol as a starting compound of rigid polyurethane foam obtained in the decomposing stage, and also a tolylene diisocyanate composition produced in the stage of re-synthesizing of isocyanate in the Tenth Embodiment.

(Twelfth Embodiment)

Figure 15:
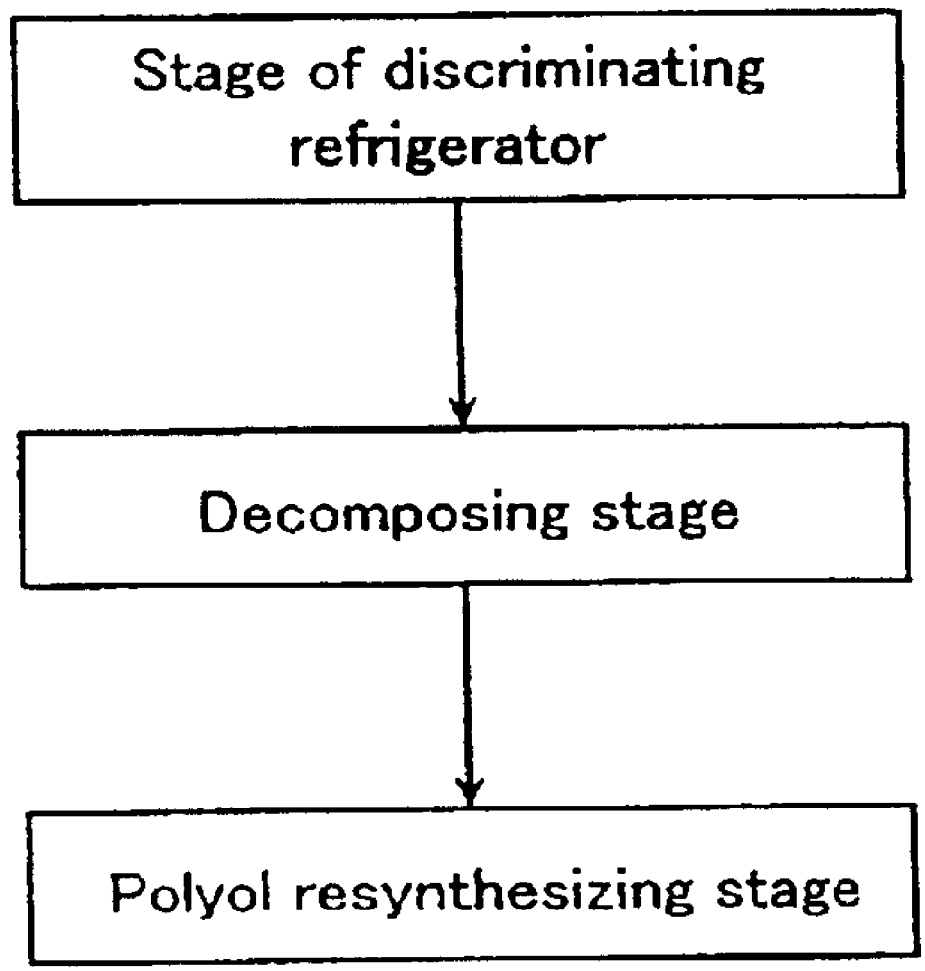
FIG. 15 is a flow chart showing a process of a Twelfth Embodiment of the present invention.

FIG. 15 is a flow chart showing a process of a Twelfth Embodiment of the present invention. The process comprises a stage of discriminating refrigerators manufactured by filling rigid polyurethane foam of a diphenylmethane diisocyanate composition; a stage of decomposing the rigid polyurethane foam into a starting compound and amines by a chemical treatment in supercritical or sub-critical water; and a polyol re-synthesizing stage to obtain polyetherpolyol by addition polymerization of the thus obtained decomposition product with ethylene oxide and/or propylene oxide.

(Thirteenth Embodiment)

Figure 16:
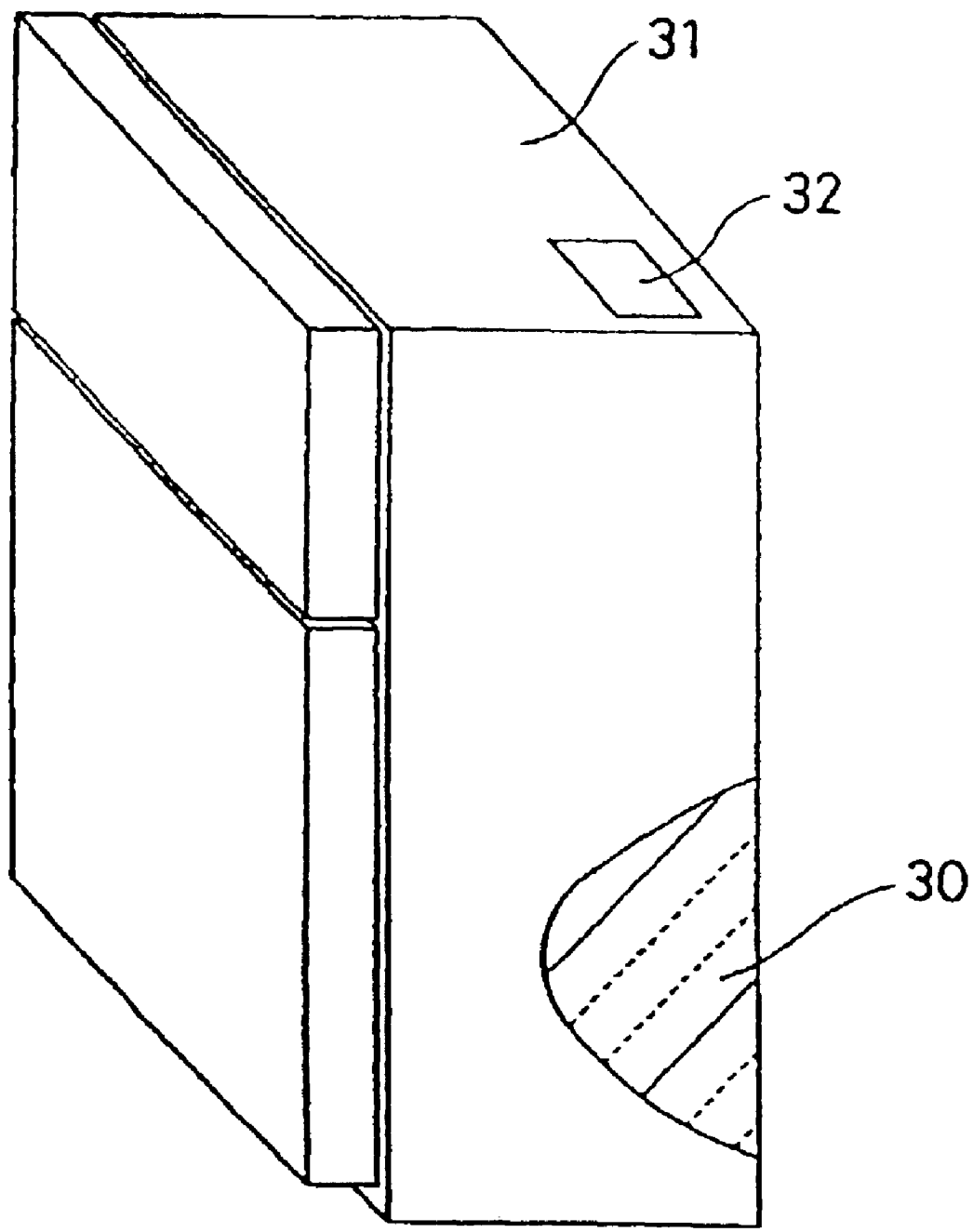
FIG. 16 is a perspective view of a refrigerator according to Thirteenth Embodiment of the present invention.

FIG. 16 is a perspective view of a refrigerator 31 in a Thirteenth Embodiment of the present invention. The refrigerator 31 in FIG. 16 includes an insulator of rigid polyurethane foam 30 containing a tolylene diisocyanate composition and polyetherpolyol produced in the polyol re-synthesizing stage in Twelfth Embodiment of the present invention. A display label 32 is attached to the refrigerator 31 in order to indicate that a tolylene diisocyanate composition is used.

(Fourteenth Embodiment)

Figure 17:
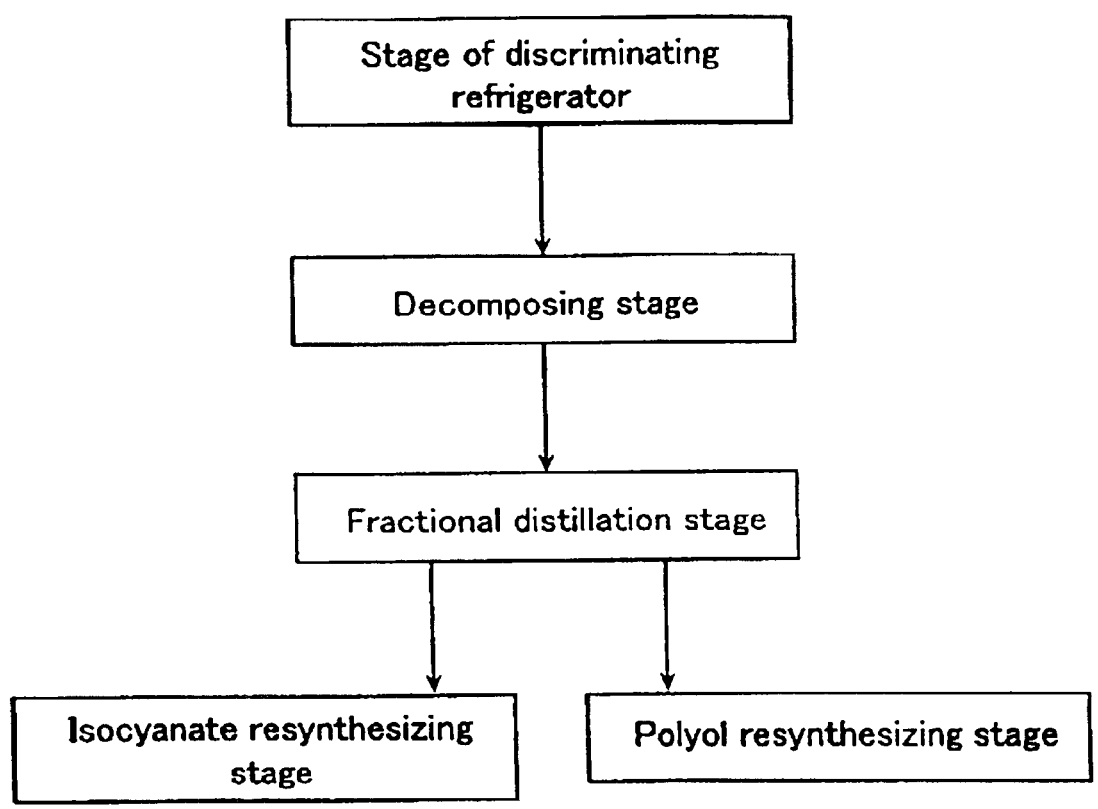
FIG. 17 is a flow chart showing a process of a Fourteenth Embodiment of the present invention.

FIG. 17 is a flow chart showing a process of a Fourteenth Embodiment of the present invention. The process comprises a stage of discriminating refrigerators manufactured by filling rigid polyurethane foam of a tolylene diisocyanate composition and a diphenylmethane diisocyanate composition; a stage of decomposing the rigid polyurethane foam into a starting compound and amines by a chemical treatment in supercritical or sub-critical water; a stage of fractionating thus obtained amines for separating the amines from the starting compound; an isocyanate re-synthesizing stage to synthesize a tolylene diisocyanate composition from tolylenediamine (a main ingredient of the amines); and a polyol re-synthesizing stage to obtain polyetherpolyol by addition polymerization of thus obtained decomposition product with ethylene oxide and/or propylene oxide.

(Fifteenth Embodiment)

Figure 18:
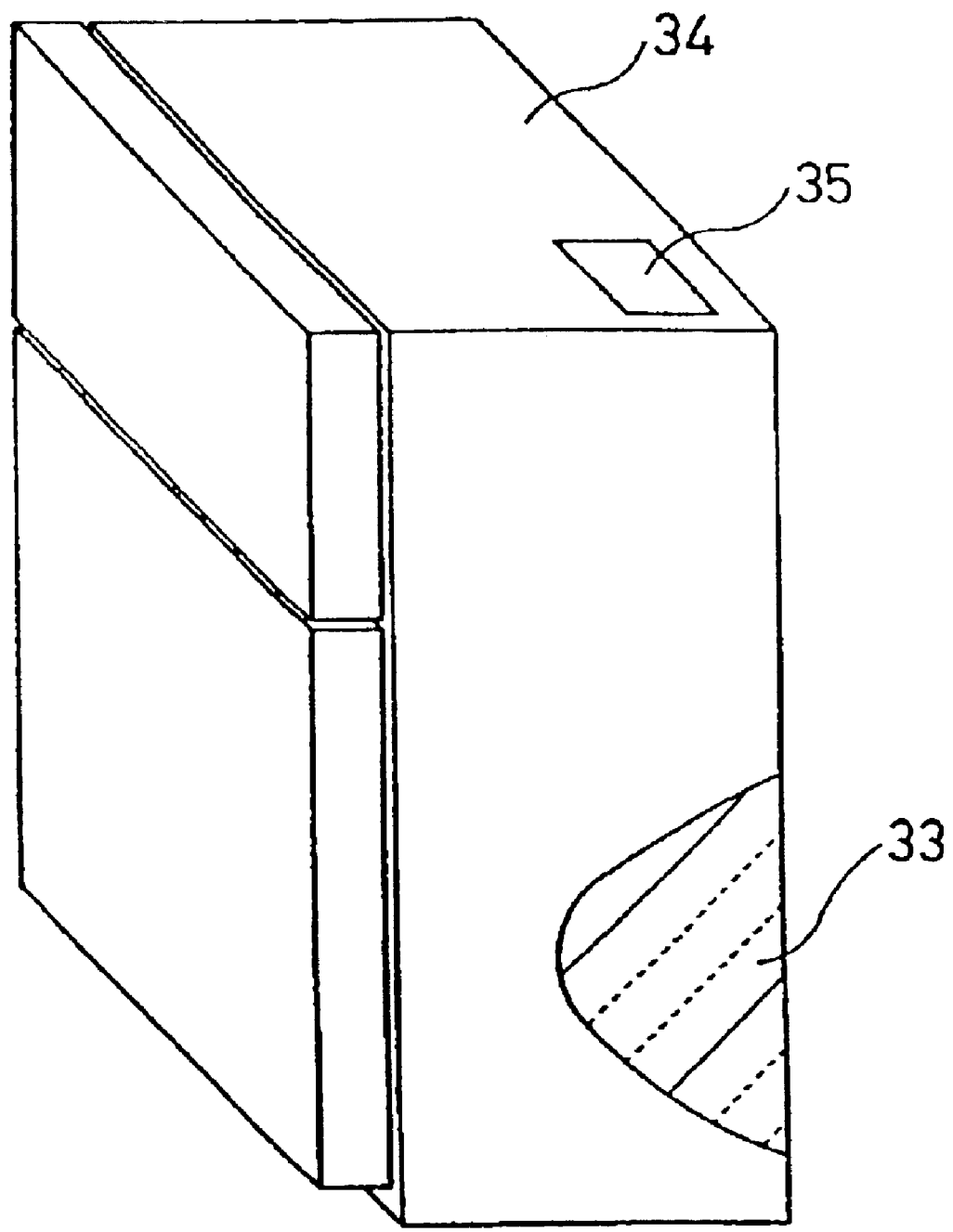
FIG. 18 is a perspective view of a refrigerator according to a Fifteenth Embodiment of the present invention.

FIG. 18 is a perspective view of a refrigerator 34 according to a Fifteenth Embodiment of the present invention. The refrigerator 34 in FIG. 18 includes an insulator of rigid polyurethane foam 33 containing a tolylene diisocyanate composition produced in the isocyanate re-synthesizing stage of the Fourteenth Embodiment and polyol produced in the polyol re-synthesizing stage in the same embodiment of the present invention. A display label 35 is attached to the refrigerator 34 in order to indicate that a tolylene diisocyanate composition is contained.

(Sixteenth Embodiment)

Figure 19:
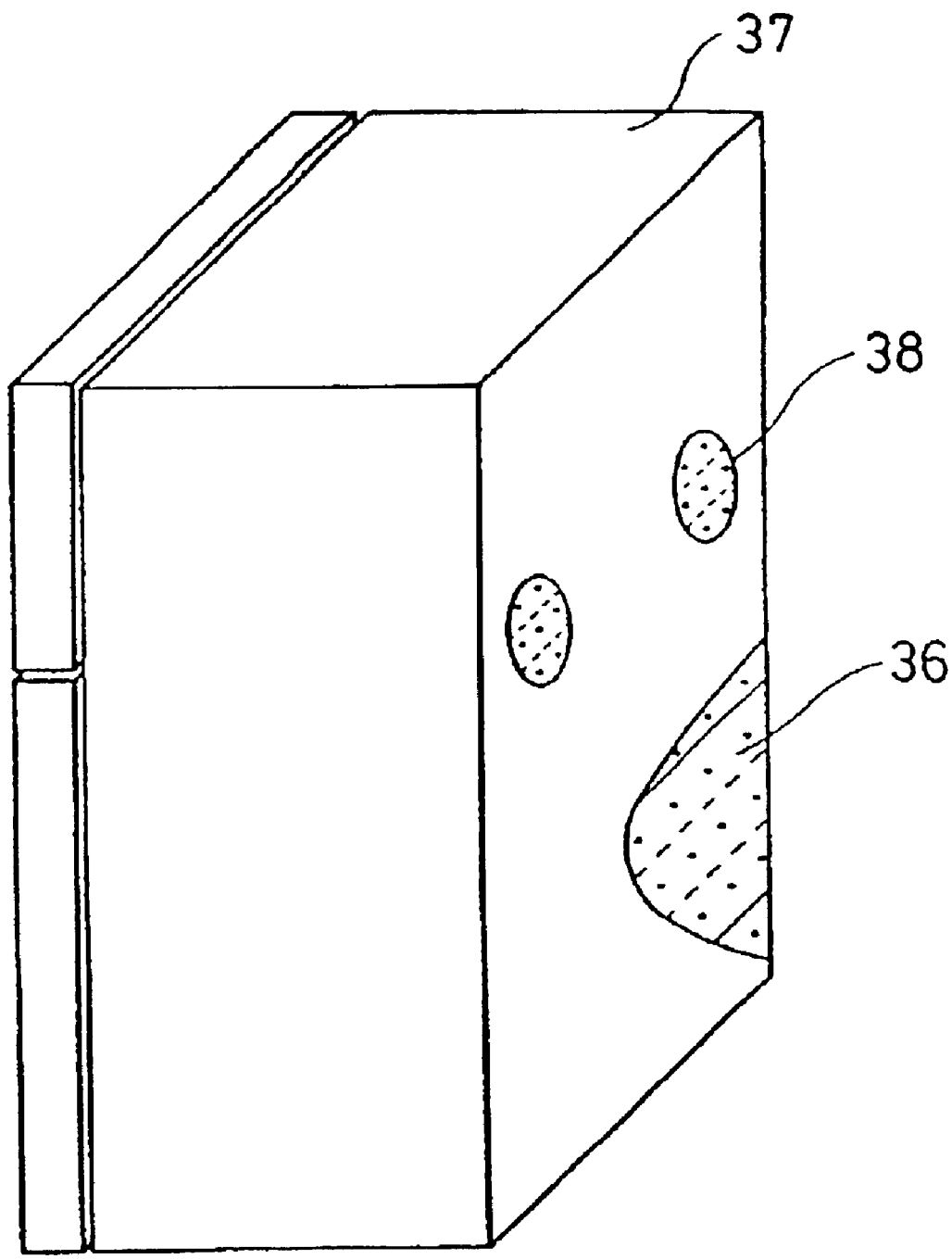
FIG. 19 is a perspective view of a refrigerator according to a Sixteenth Embodiment of the present invention.

FIG. 19 is a perspective view of a refrigerator 37 according to a Sixteenth Embodiment of the present invention. The refrigerator 37 in FIG. 19 includes an insulator of rigid polyurethane foam 36 containing a tolylene diisocyanate composition produced in the isocyanate re-synthesizing stage of the Fourteenth Embodiment and polyol produced in the polyol re-synthesizing stage in the same embodiment of the present invention. The rigid polyurethane foam 36 is colored with a pigment to indicate use of the tolylene diisocyanate composition. A transparent film is used for a seal cap 38 of the injection hole formed on the backside of the refrigerator 37, so that the color tone of the rigid polyurethane foam 36 can be identified.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A refrigerator manufactured by filling rigid polyurethane foam, provided with a label to identify the type of a rigid polyurethane foam material comprising an insulator of rigid polyurethane foam manufactured by forming and curing a polyurethane foam material containing a raw material produced by a method comprising:

shredding a scrapped refrigerator comprising rigid polyurethane foam in order to separate a lump of rigid polyurethane foam, grinding the rigid polyurethane foam lump into a rigid polyurethane foam powder, liquefying the rigid polyurethane foam powder by aminolysis reaction or by glycolysis reaction, removing particles of impurities by filtering the liquefied rigid polyurethane foam powder, and reacting the liquefied rigid polyurethane foam powder with either supercritical water or sub-critical water in order to decompose the rigid polyurethane foam powder.

2. The refrigerator according to claim 1, wherein the identified material is a rigid polyurethane foam manufactured by using a material containing at least one composition selected from the group consisting of a tolylene diisocyanate composition, a diphenylmethane diisocyanate composition, and a mixture thereof, and the material is identified with color tones.

3. The refrigerator according to claim 1, wherein the material of the rigid polyurethane foam is displayed or recorded on a seal cap covering an injection hole formed on an outer case or backside of the refrigerator.

* * * * *